US012689203B2

(12) United States Patent
Dong et al.

(10) Patent No.: US 12,689,203 B2
(45) Date of Patent: Jul. 21, 2026

(54) PORTED HARDWARE FOR OVERHEAD ELECTRICAL CABLES

(71) Applicant: CTC Global Corporation, Irvine, CA (US)

(72) Inventors: Xiaoyuan Dong, Irvine, CA (US); William Webb, Laguna Niguel, CA (US); Ian M. Pilling, Irvine, CA (US); Douglas A. Pilling, Irvine, CA (US); Christopher Wong, Irvine, CA (US)

(73) Assignee: CTC Global Corporation, Irvine, CA (US)

( * ) Notice: Subject to any disclaimer, the term of this patent is extended or adjusted under 35 U.S.C. 154(b) by 150 days.

(21) Appl. No.: 17/787,534

(22) PCT Filed: Dec. 21, 2020

(86) PCT No.: PCT/US2020/066490
§ 371 (c)(1),
(2) Date: Jun. 20, 2022

(87) PCT Pub. No.: WO2021/127659
PCT Pub. Date: Jun. 24, 2021

(65) Prior Publication Data
US 2022/0385055 A1 Dec. 1, 2022

Related U.S. Application Data

(60) Provisional application No. 62/952,113, filed on Dec. 20, 2019.

(51) Int. Cl.
*H02G 15/02* (2006.01)
*H01R 4/50* (2006.01)
(Continued)

(52) U.S. Cl.
CPC ........... *H02G 15/02* (2013.01); *H01R 4/5025* (2013.01); *H01R 4/56* (2013.01); *H01R 11/12* (2013.01);
(Continued)

(58) Field of Classification Search
CPC .......... H02G 15/02; H02G 15/06; H02G 7/00; H02G 7/04; H02G 7/05; H02G 7/056;
(Continued)

(56) References Cited

U.S. PATENT DOCUMENTS 2,753,541 A * 7/1956 Leonard ............... H01R 4/5025
439/805
4,252,992 A * 2/1981 Cherry ................... F16G 11/08
174/94 R
(Continued)

FOREIGN PATENT DOCUMENTS

AT 16006 U1 10/2018
CA 3088407 A1 8/2019
(Continued)

OTHER PUBLICATIONS

Office Action dated Aug. 25, 2022 for Pakistan Patent Application No. 8672020.
(Continued)

*Primary Examiner* — Roshn K Varghese
(74) *Attorney, Agent, or Firm* — David F. Dockery; The Navitas Intellectual Property Group LLC

(57) ABSTRACT

Electrical line hardware such as termination arrangements and splices for use with overhead electrical cables that enable the interrogation of the overhead electrical cables through the hardware. The hardware includes at least one port to facilitate access to the strength member of the electrical cable so that interrogation instruments may operatively couple to the strength member and to interrogation
(Continued)

elements such as optical fibers associated with the strength member. The interrogation may occur after the overhead electrical cable has been fully tensioned and secured by the hardware, e.g., secured to a support tower.

33 Claims, 13 Drawing Sheets

(51) Int. Cl.

| | |
|---|---|
| *H01R 4/56* | (2006.01) |
| *H01R 11/12* | (2006.01) |
| *H01R 43/00* | (2006.01) |
| *H02G 1/02* | (2006.01) |
| *H02G 7/05* | (2006.01) |

(52) U.S. Cl.
CPC ............... *H01R 43/00* (2013.01); *H02G 1/02* (2013.01); *H02G 7/05* (2013.01)

(58) Field of Classification Search
CPC .......... H02G 1/02; H01R 4/5025; H01R 4/56; H01R 43/00; H01R 11/12
USPC .............. 174/74 R, 84 C, 79, 88 R, 75 R, 99
See application file for complete search history.

(56) References Cited

U.S. PATENT DOCUMENTS

| | | | | |
|---|---|---|---|---|
| 4,821,138 | A | 4/1989 | Nakano et al. | |
| 6,015,953 | A * | 1/2000 | Tosaka ..................... | H01R 4/20 |
| | | | | 174/79 |
| 8,022,301 | B2 | 9/2011 | Bryant et al. | |
| 2004/0131834 | A1 | 7/2004 | Hiel et al. | |
| 2005/0006129 | A1 | 1/2005 | Bryant | |
| 2007/0187131 | A1* | 8/2007 | Bryant ................... | H02G 15/10 |
| | | | | 174/88 R |
| 2010/0243320 | A1 | 9/2010 | Bryant et al. | |
| 2011/0108306 | A1 | 5/2011 | Parham, Jr. et al. | |
| 2012/0034025 | A1 | 2/2012 | Wahlberg et al. | |
| 2012/0305312 | A1 | 12/2012 | Mccullough et al. | |
| 2013/0043072 | A1 | 2/2013 | Khansa et al. | |
| 2015/0107875 | A1 | 4/2015 | Diop et al. | |
| 2016/0265339 | A1 | 9/2016 | Xia et al. | |
| 2017/0288383 | A1* | 10/2017 | Quesnel ................... | H02G 1/14 |
| 2018/0062370 | A1 | 3/2018 | Heidmann et al. | |
| 2019/0386410 | A1 | 12/2019 | Olszewski et al. | |
| 2021/0050679 | A1 | 2/2021 | Lee et al. | |

FOREIGN PATENT DOCUMENTS

| | | | |
|---|---|---|---|
| CN | 102810834 A | 12/2012 | |
| CN | 104535220 A | 4/2015 | |
| CN | 105990708 A | 10/2016 | |
| CN | 106602492 A | 4/2017 | |
| CN | 108432052 A | 8/2018 | |
| CN | 208939155 U | 6/2019 | |
| DE | 2064023 A1 | 4/1972 | |
| EP | 3001507 A1 | 3/2016 | |
| FR | 627055 A | 9/1927 | |
| JP | 56171523 U | 12/1981 | |
| JP | 58186311 A | 10/1983 | |
| JP | 63010726 A | 1/1988 | |
| JP | 63044629 U1 | 3/1988 | |
| JP | H07231546 A | 8/1995 | |
| JP | 2004343834 A | 12/2004 | |
| JP | 2013042655 A | 2/2013 | |
| KR | 20120138763 A | 12/2012 | |
| TW | 201916513 A | 4/2019 | |
| WO | 1995024667 A1 | 9/1995 | |
| WO | 2019147838 A1 | 8/2019 | |
| WO | 2020181248 A2 | 9/2020 | |

OTHER PUBLICATIONS

Office Action dated Jul. 7, 2022 for Taiwanese Patent Application No. 109145047.
Office Action dated Nov. 14, 2022 for Eurasian Patent Application No. 202291961.
Preliminary Search Examination Report and Written Opinion dated Apr. 8, 2024 for Panama Patent Application No. 93997-01.
International Search Report and Written Opinion of the International Searching Authority dated Apr. 21, 2021 for PCT Application No. PCT/US2020/066490.
Office Action dated Feb. 27, 2024 for Egyptian Patent Application No. EG/P/2022/835.
Office Action Dated Nov. 16, 2023 for Chilean Patent Application No. 1688-2022.
Office Action Dated Sep. 17, 2023 for Saudi Arabian Patent Application No. 522433071.
Office Action dated Sep. 6, 2023 for Canadian Patent Application No. 3,162,328.
Extended European Search Report dated Dec. 8, 2023 for European Patent Application No. 20903441.2.
Office Action dated Apr. 22, 2024 for Saudi Arabian Patent Application No. 522433071.
Office Action dated Apr. 8, 2024 for Argentine Patent Application No. 20200103585.
Office Action dated Aug. 14, 2024 for Chilean Patent Application No. 1688-2022.
Office Action dated Jul. 29, 2024 for Egyptian Patent Application No. EG/P/2022/835.
Office Action dated Jun. 27, 2024 for Chinese Patent Application No. 202080096046.1.
Office Action dated Apr. 16, 2025 for Chile Patent Application No. 1688-2022.
Office Action dated Apr. 4, 2025 for Mexico Patent Application No. MXa2022007757.
Office Action dated Apr. 8, 2025 for Chinese Patent Application No. 202080096046.1.
Office Action dated Dec. 30, 2024 for Canada Patent Application No. 3,162,328.
Office Action dated Feb. 11, 2025 for Argentina Patent Application No. 20200103585.
Office Action dated Feb. 11, 2025 for Paraguay Patent Application No. 86450/2020.
Office Action dated Feb. 18, 2025 for Japan Patent Application No. 2022-537074.
Office Action dated Jan. 22, 2025 for Venezuela Patent Application No. 2020-000238.
Office Action dated Mar. 15, 2025 for South Korea Patent Application No. 10-2022-7024737.
Office Action dated May 22, 2025 for Vietnamese Patent Application No. 1-2022-04574.
Office Action dated May 27, 2025 for Ukraine Patent Application No. a202202586.
Office Action dated Nov. 14, 2024 for Israel Patent Application No. 294110.
Office Action dated Nov. 25, 2024 for Dominican Republic Patent Application No. P2022-0132.
Office Action dated Oct. 10, 2024 for United Arab Emirates Patent Application No. P6001185/2022.
Office Action dated Oct. 14, 2024 for ARIPO Patent Application No. AP/P/2022/014212.
Office Action Written Opinion dated Apr. 9, 2025 for Singapore Patent Application No. 11202250597J.
Wu Guohong, Yuan Zhiping, "Pressure Contact Technique for Strain Clamps Used for Conductors with Large-cross Section", Electric Power Construction, Issue 5, 2010, vol. 31, pp. 126-129.
Decision on Rejection dated Sep. 9, 2025 for Japanese Patent Application No. 2022-537074.
Office Action dated Aug. 26, 2025 for Chinese Patent Application No. 202080096046.1.
Office Action dated Aug. 5, 2025 for Colombian Patent Application No. NC2022/0009897.

(56)         References Cited

OTHER PUBLICATIONS

Office Action dated Jan. 15, 2026 for Brazilian Patent Application No. BR112022012267-5.
Office Action dated Jan. 2, 2026 for European Patent Application No. 20903441.2.
Office Action dated Oct. 1, 2025 for Chilean Patent Application No. 1688-2022.
Office Action dated Oct. 6, 2025 for Uruguayan Patent Application No. 38996.
Office Action dated Sep. 15, 2025 for Indonesian Patent Application No. P00202207684.
Office Action dated Sep. 18, 2025 for Australian Patent Application No. 2020405218.
Office Action dated Sep. 30, 2025 for Mexican Patent Application No. MX/a/2022/007757.

* cited by examiner

FIG. 2    (Prior Art)

PORTED HARDWARE FOR OVERHEAD ELECTRICAL CABLES

CROSS-REFERENCE TO RELATED APPLICATIONS

This application claims the priority benefit of U.S. Provisional Patent Application No. 62/952,113 filed on Dec. 20, 2019, which is incorporated herein by reference in its entirety.

FIELD

This disclosure relates to the field of overhead electrical cables, and particularly to hardware components that are used to install and support overhead electrical cables for the transmission and distribution of electricity.

SUMMARY

In one embodiment, a termination arrangement for an overhead electrical cable is disclosed. The termination arrangement comprises a gripping element configured to grip a strength member of an overhead electrical cable and a connector operatively attached to the gripping element. The connector comprises a connector body and a connector body bore extending longitudinally from a first aperture in a distal end of the connector body toward a proximal end of the connector body.

In another embodiment, a method for terminating an overhead electrical cable comprising a central strength member and a plurality of conductive strands wrapped around the strength member, is disclosed. The method includes the steps of separating an end portion of the strength member from the conductive strands, inserting the end portion of the strength member into a termination arrangement, the termination arrangement comprising a connector having a connector body and a connector body bore, wherein the step of inserting the strength member includes placing the end portion of the strength member at least partially into the connector body bore.

In another embodiment, a method for interrogating an overhead electrical cable through a termination arrangement is disclosed where the overhead electrical cable has a strength member comprising interrogation elements and a plurality of conductive strands wrapped around the strength member. The method includes the steps of separating an end segment of the strength member from the conductive strands, operatively securing a termination arrangement to the overhead electrical cable, where the termination arrangement includes a gripping element configured to grip the strength member and a connector operatively attached to the gripping element, the connector comprising a connector body and a connector body bore extending longitudinally from a first aperture in a proximal end of the connector body toward a distal end of the connector body. The step of operatively securing the termination arrangement to the overhead electrical cable includes securing a first portion of the end segment of the strength member with the gripping element and placing a second portion of the end segment of the strength member into the connector body bore. Interrogation of the strength member may be carried out by operatively linking (e.g., contacting directly or indirectly) an interrogation device to the end of the strength member. During the interrogation, the strength member may be fully disposed within the termination arrangement or may extend beyond the termination arrangement.

These and other embodiments of the present disclosure will be apparent from the following description.

DESCRIPTION OF THE EMBODIMENTS

Figure 1:
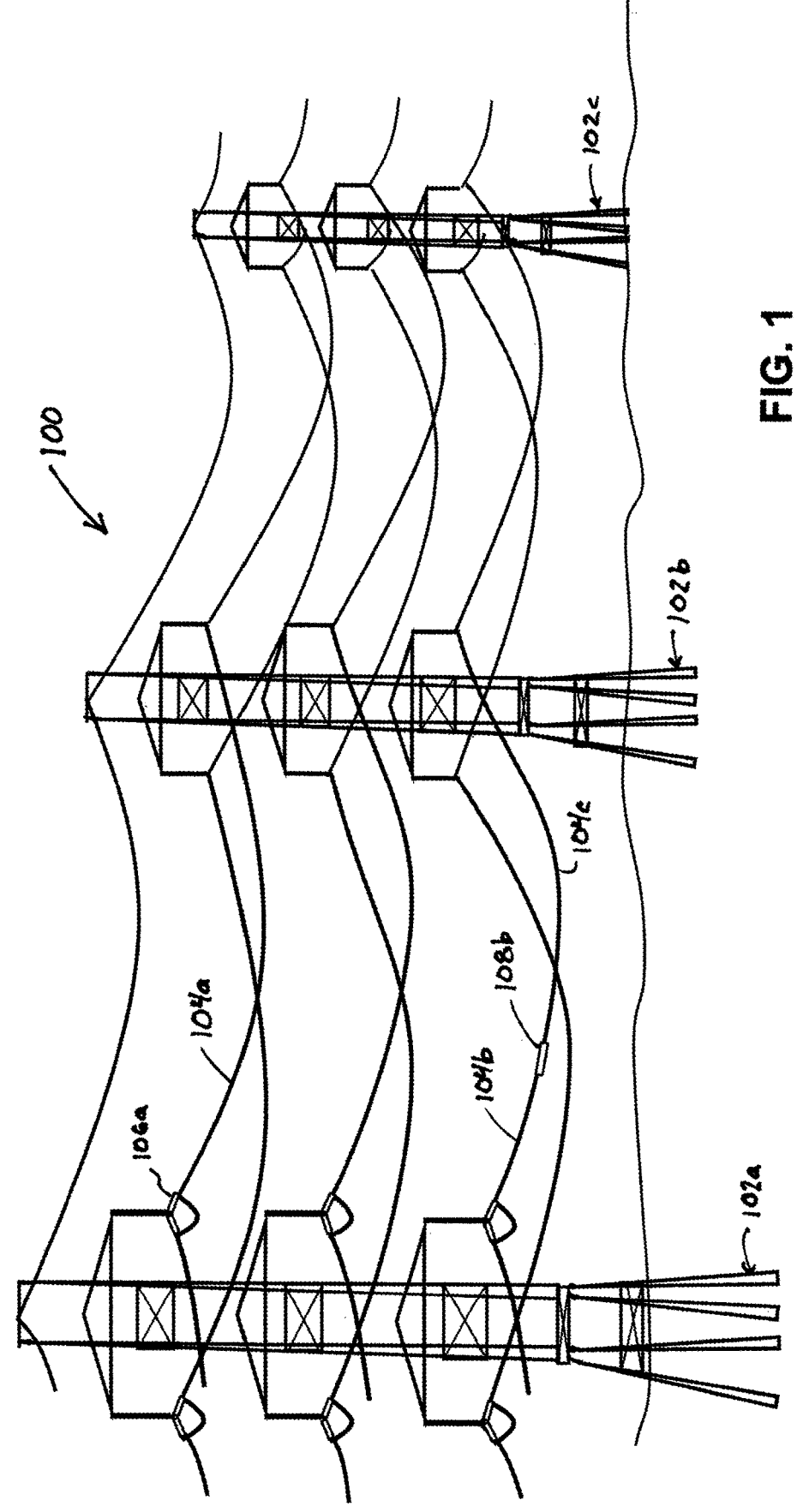
FIG. 1 illustrates a portion of an overhead electrical transmission line.

FIG. 1 illustrates a portion of an overhead electrical transmission line 100 for the transmission of electricity. Overhead electrical transmission and distribution lines are constructed by elevating bare electrical cables (e.g., electrical cable 104a) above the terrain using support towers (e.g., pylons) such as support towers 102a/102b/102c. The transmission and distribution lines may span many miles, requiring extremely long lengths of electrical cable and many support towers. Some of the support towers are referred to as dead-end towers or anchor towers, such as tower 102a. Such towers are located at termination points, e.g., power substations or locations where the electrical line is routed underground. Dead-end towers, such as tower 102a, may also be required where the electrical line changes direction (e.g., makes a turn), or at regular intervals in a long, straight line path. In such instances, the overhead electrical cable must be terminated and secured to the dead-end tower under high tension. As illustrated in FIG. 1, electrical cable 104a is secured to tower 102a using a dead end 106a termination structure.

Another termination structure is referred to as a splice. While the length of a single segment of overhead cable may cover several thousand feet, a power grid requires several hundreds or even thousands of miles of electrical cable. To span these distances, the linemen must often splice (e.g., couple) two smaller cable segments together. Thus, one or more splices may be placed between two dead ends of an overhead cable installation. The splice functions as both a mechanical junction that holds the two ends of the cables together and an electrical junction allowing the electric current to flow through the splice. As illustrated in FIG. 1, a splice 108b operatively connects electrical cable 104b to electrical cable 104c to form a mechanical junction and a continuous electrical pathway.

Figure 2:
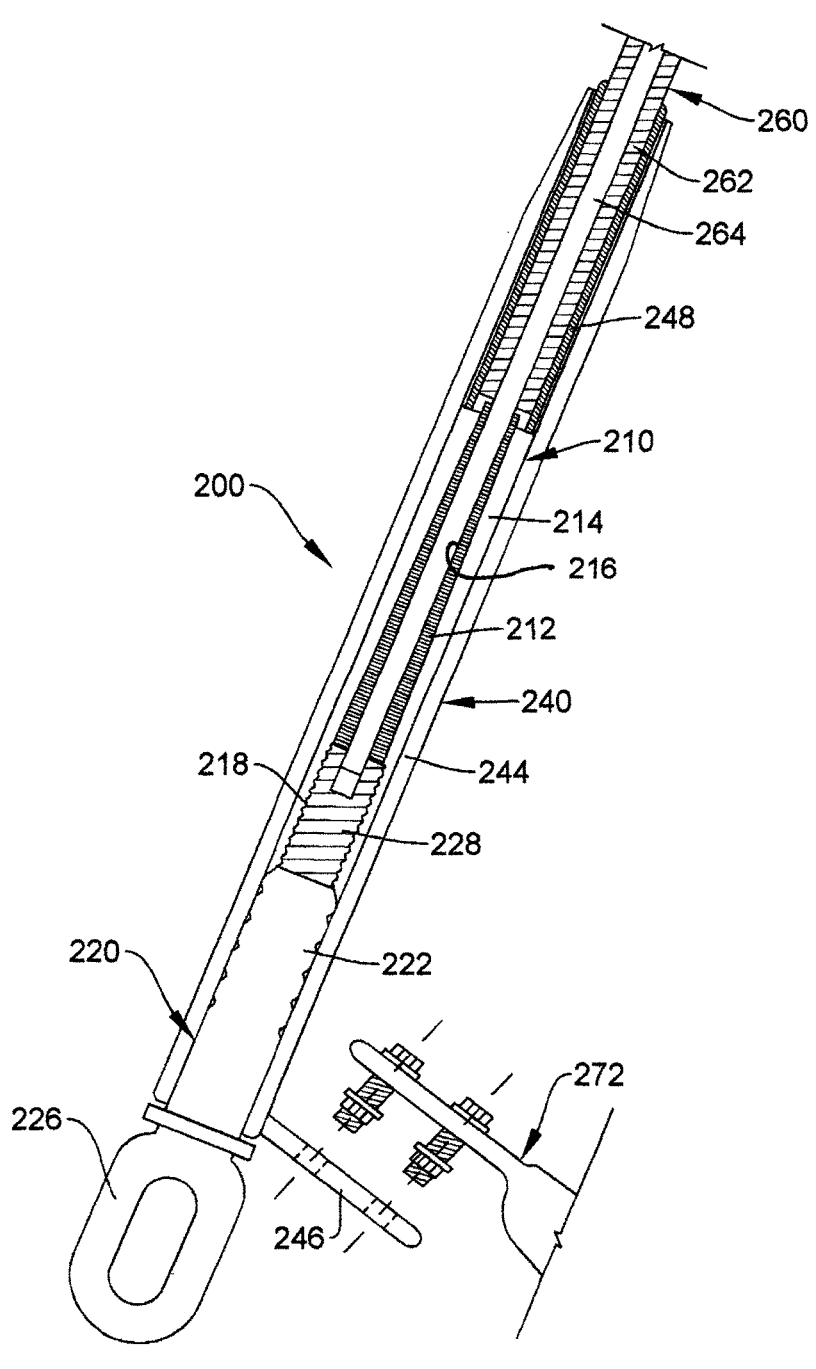
FIG. 2 illustrates a cross-sectional view of an assembled termination arrangement according to the prior art.

FIG. 2 illustrates a cross-section of a termination arrangement (e.g., a dead-end) for use with a bare overhead electrical cable, e.g., such as dead-end 106a in FIG. 1. The termination arrangement 200 illustrated in FIG. 2 is similar to that illustrated and described in PCT Publication No. WO 2005/041358 by Bryant and in U.S. Pat. No. 8,022,301 by Bryant et al., each of which is incorporated herein by reference in its entirety.

Broadly characterized, the termination arrangement 200 illustrated in FIG. 2 includes a gripping element 210 and a connector 220 for anchoring the termination arrangement 200 to a dead-end structure (e.g., to a tower), not illustrated, e.g., with a fastener 226 (e.g., an eyebolt) disposed at a proximal end of the termination arrangement 200. At the end of the termination arrangement 200, opposite the fastener 226, the termination arrangement 200 is operatively connected to a bare overhead electrical cable 260 that includes an electrical conductor 262 (e.g., comprising conductive strands) that surrounds and is supported by a strength member 264, e.g., a fiber-reinforced composite strength member.

The gripping element 210 tightly grips the strength member 264 to secure the overhead electrical cable 260 to the termination arrangement 200. As illustrated in FIG. 2, the gripping element 210 includes a compression-type fitting (e.g., a wedge-type fitting), specifically a collet 212 having a lumen 216 (e.g., a bore) that surrounds and grips onto the strength member 264. The collet 212 is disposed in a collet housing 214, and as the electrical cable 260 is tensioned (e.g., is pulled onto support towers), friction develops between the strength member 264 and the collet 212 as the collet 212 is pulled further into the collet housing 214. The conical (outer) shape of the collet 212 and the mating inner funnel shape of the collet housing 214 create increased compression on the strength member 264, ensuring that the strength member 264 does not slip out of the collet 212 and therefore that the overhead electrical cable 260 is secured to the termination arrangement 200.

As illustrated in FIG. 2, an outer sleeve 240 is disposed over the gripping element 210 and includes a conductive body 244 to facilitate electrical conduction between the electrical conductor 262 and a jumper plate 246. An inner sleeve 248 (e.g., a conductive inner sleeve) may be placed between the conductor 262 and the conductive body 244 to facilitate the electrical connection between the conductor 262 and the conductive body 244. The conductive body 244 may be fabricated from aluminum, and the jumper plate 246 may be welded onto the conductive body 244, for example. The jumper plate 246 is configured to attach to a connection plate 272 to facilitate electrical conduction between the electrical conductor 262 and another conductor, e.g., another electrical cable (not illustrated) that is in electrical communication with the connector plate 272.

The connector 220 includes a fastener 226 and gripping element mating threads 228 disposed at a gripping element end of the connector 220, with a connector body 222 disposed between the fastener 226 and the gripping element mating threads 228. The gripping element mating threads 228 are configured to operatively mate with connector mating threads 218 of the collet housing 214 to facilitate movement of the connector 220 toward the collet 212, pushing the collet 212 into the collet housing 214, when the threads 218 and 228 are engaged and the connector 220 is rotated relative to the collet housing 214. This strengthens the grip of the collet 212 onto the strength member 264, further securing the overhead electrical cable 260 to the termination arrangement 200. The fastener 226 is configured to be attached to a dead-end structure, e.g., to a dead-end tower, to secure the termination arrangement 200 and the electrical cable 260, to the dead-end structure.

Figure 3:
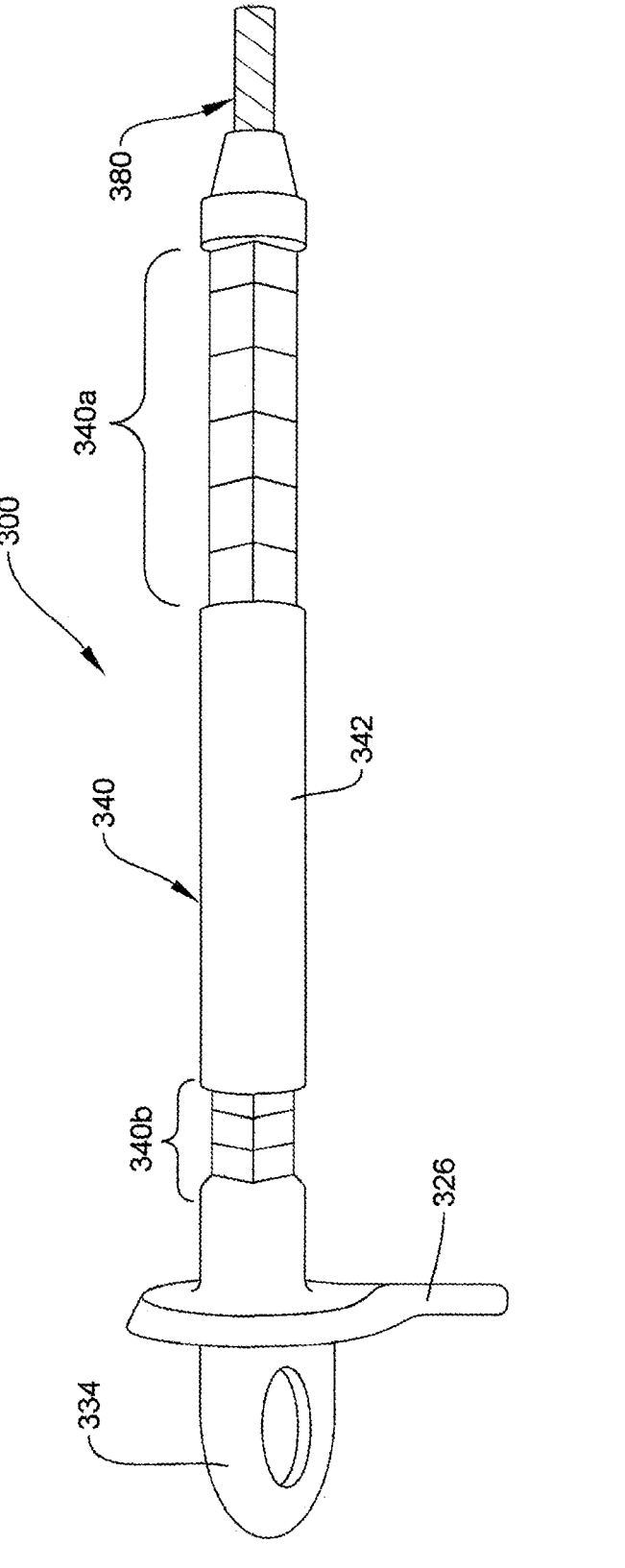
FIG. 3 illustrates a perspective view of an assembled and crimped termination arrangement according to the prior art.

FIG. 3 illustrates a perspective view of a termination arrangement, similar to the termination arrangement of FIG. 2, that has been crimped onto an overhead electrical cable. The termination arrangement 300 includes a connector having a fastener 334 that extends outwardly from a proximal end of an outer sleeve 340. A jumper plate 326 is integrally formed with the conductive body 342 for electrical connection to a connection plate (e.g., see FIG. 2). As illustrated in FIG. 3, the outer sleeve 340 is crimped over (e.g., onto) two regions of the underlying structure, namely crimped sleeve region 340b and crimped sleeve region 340a. The crimped sleeve region 340b is generally situated over an intermediate portion of the underlying connector (e.g., see FIG. 2), and the crimped sleeve region 340a is generally situated over a portion of the overhead electrical cable 380. The compressive forces placed onto the outer sleeve 340 during the crimping operation are transferred to the underlying components, i.e., to the connector under the crimped region 340b and to the overhead electrical cable 380 under the crimped region 340a to permanently secure the termination arrangement 300 to the electrical cable 380.

The termination arrangements broadly described with respect to FIGS. 2 and 3 can be utilized with various bare overhead electrical cable configurations. The termination arrangements illustrated in FIGS. 2 and 3 are particularly useful with overhead electrical cables having a fiber-reinforced composite strength member. For example, a compression wedge gripping element, e.g., having a collet disposed in a collet housing (e.g., FIG. 2), enables a fiber-reinforced composite strength member to be gripped under a high compressive force without significant risk of fracturing the composite material.

Figure 4:
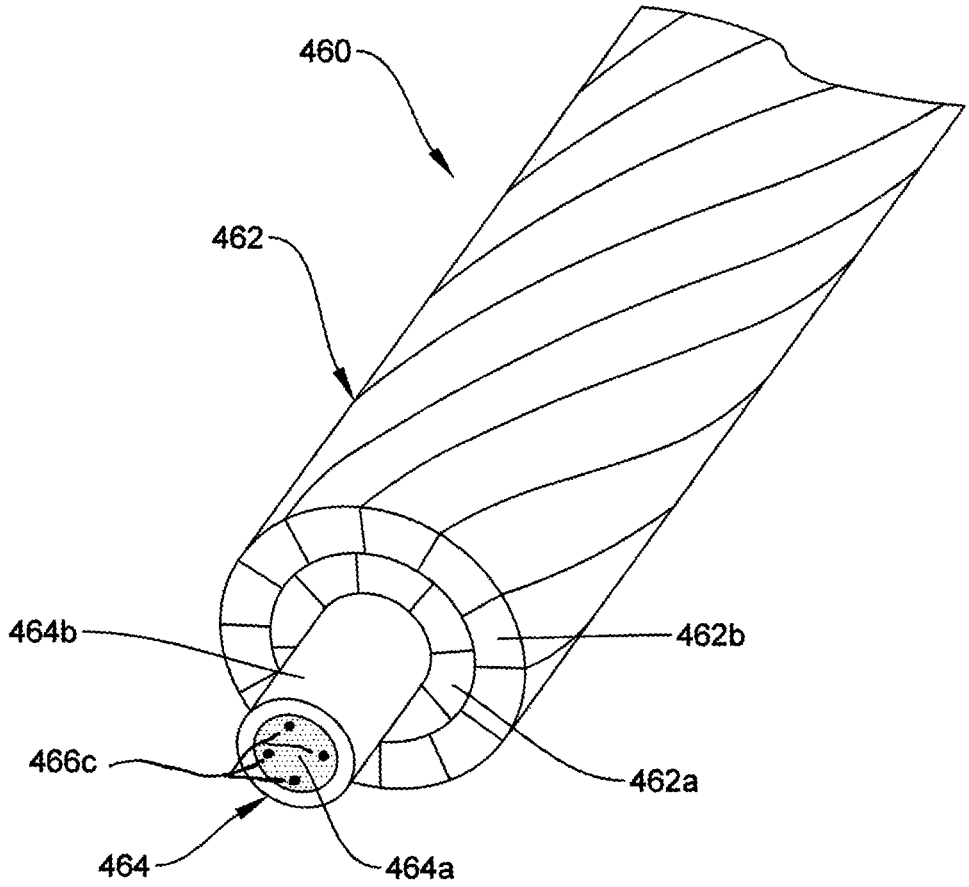
FIG. 4 illustrates an overhead electrical cable including sensing elements disposed within a strength member.

FIG. 4 illustrates an overhead electrical cable 460 (e.g., a bare overhead electrical cable) that includes a strength member 464 fabricated from a fiber-reinforced composite material. The electrical cable 460 includes a conductor 462 comprising a first plurality of conductive strands 462a that are helically wrapped around (e.g., stranded around) a strength member 464. A second plurality of conductive strands 462b are wrapped around the first conductive strands. The conductive strands 462a/462b may be fabricated from conductive metals such as copper or aluminum, and for use in bare overhead electrical cables are typically are fabricated from aluminum. The conductive materials, e.g., aluminum, and do not have sufficient mechanical properties (e.g., sufficient tensile strength) to be self-supporting when strung between support towers to form an overhead electrical line for transmission and/or distribution of electricity. Therefore, the strength member 464 supports the electrical conductor 462 when the overhead electrical cable 460 is strung between support towers under high mechanical tension.

The strength member 464 illustrated in FIG. 4 is a fiber-reinforced composite strength member, e.g., comprising a plurality of reinforcing fibers disposed in a binding matrix. As illustrated in FIG. 4, the strength member includes an inner section 464a comprising substantially continuous reinforcing carbon fibers disposed in a polymer binding matrix. An insulative layer 464b surrounds the inner section 464a and may include substantially continuous reinforcing glass fibers in a polymer binding matrix for example. An overhead electrical cable of this configuration is available under the trademark ACCC® (CTC Global Corp., Irvine, CA), and is described in U.S. Pat. No. 7,368,162 by Hiel et al., which is incorporated herein by reference in its entirety. Such fiber-reinforced composite strength members may include of a single fiber-reinforced composite strength element (e.g., a single rod) as is illustrated in FIG. 4. Alternatively, the composite strength member may be comprised of a plurality of individual fiber-reinforced composite strength elements (e.g., individual rods) that are operatively combined (e.g., twisted or stranded together) to form the strength member. Examples of such multi-element composite strength members include, but are not limited to: the multi-element aluminum matrix composite strength member illustrated in U.S. Pat. No. 6,245,425 by Mccullough et al.; the multi-element carbon fiber strength member illustrated in U.S. Pat. No. 6,015,953 by Tosaka et al.; and the multi-element strength member illustrated in U.S. Pat. No. 9,685, 257 by Daniel et al. Each of these U.S. patents is incorporated herein by reference in its entirety. Other configurations and materials (e.g., other fibers and/or matrix materials) may be used for the fiber-reinforced composite strength member.

In the overhead electrical cable illustrated in FIG. 4, the strength member 464 also includes a plurality of interrogation elements, namely optical fibers 464c, embedded within the strength member, e.g., embedded within the inner section 464a. It has been suggested that such embedded optical fibers 466c may be utilized for communications (e.g., data transfer), or may be utilized to interrogate (e.g., to inspect) the strength member 464 to determine a condition of the strength member 464 and/or of the electrical cable 460. For example, it has been suggested that OTDR (optical time domain reflectometry) may be used to assess the temperature or stress state of the strength member 464 along its length. Another example of interrogation elements being used in an overhead electrical cable is illustrated in International Patent Publication No. WO 2019/168998 by Dong et al., which is incorporated herein by reference in its entirety.

No matter the function of the interrogation elements, e.g., the optical fibers, it will be necessary to access the interrogation elements, e.g., to reliably introduce light into the ends of the optical fibers, and to detect and/or analyze light emanating from the optical fibers. However, as can be seen in FIGS. 2 and 3, when the overhead electrical cable is terminated at a dead end (i.e., using a termination arrangement described above), the end of the strength member, and therefore the ends of the optical fibers, can no longer be accessed to pass a signal into the optical fibers and/or to detect a light signal emanating from the optical fibers.

It is an object of the present disclosure to provide hardware such as a termination arrangement (e.g., a dead-end or a splice) for use with an overhead electrical cable that enables access to an end of the strength member and to optical fibers or similar interrogation elements disposed therein, even after the overhead electrical cable has been installed, e.g., after a span of the overhead electrical cable has been strung and terminated.

Figures 5A, 5B, 5C, 5D:
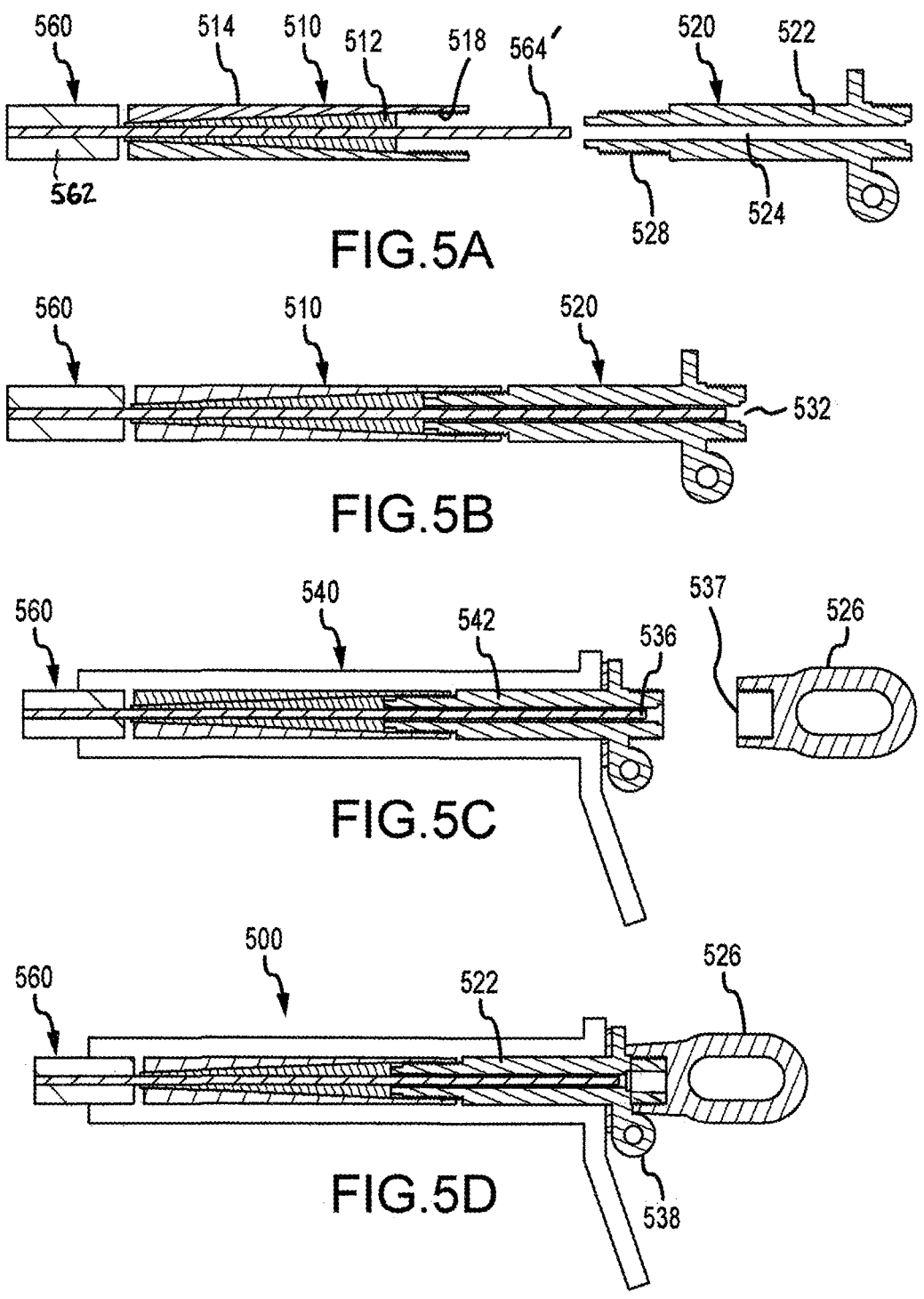
FIGS. 5A-5E illustrate a termination arrangement according to an embodiment the present disclosure in various states of assembly.

FIGS. 5A-5E illustrate such a termination arrangement according to one embodiment. The termination arrangement 500 is illustrated in the various forms of assembly from the exploded view of FIG. 5A to the assembled view of FIG. 5D for better illustration of the embodiment. FIG. 5A illustrates a partial assembly including a gripping element 510 that comprises a collet 512 disposed in a collet housing 514. An end segment 564' of the strength member 564 is separated from the conductive strands 582 (e.g., by stripping away the conductive strands 582) and is placed through the collet 512, e.g., through the collet bore, so that the end segment 564' extends for a length out of the proximal end of the collet 512 and past a proximal end of the collet housing 514.

A connector 520 having a connector body 522 is operatively attached to the gripping element 510 by placing the connector body bore 524 over the end segment 564' and moving the connector 520 toward the gripping element 510. As the connector 520 and the gripping element 510 come together, the gripping element mating threads 528 and the connector mating threads 518 on the collet housing 514 come together and are engaged by relative rotation of the connector 520 and the gripping element 510. As the connector/element are rotated, the threads force the connector 520 into engagement with the collet 512, forcing the collet 512 into the collet housing 514 and increasing the pressure (e.g., the grip) of the collet 512 onto the strength member 564. See FIG. 5B.

As a result, the end segment 564' of the strength member 564 extends past the gripping element 510 and into the connector body bore 524. As illustrated in FIGS. 5A to 5D, the strength member end segment 564' extends into the bore 524 but does not extend past the proximal end (i.e., the fastener end) of the bore 524. As can be seen in FIG. 5B, the end of the strength member 564 is accessible using the proximal aperture 532, i.e., the aperture 532 in the proximal end of the connector body 522. This feature is enabled by the connector body bore 524 and by the connector body aperture 532, which exposes the end of the strength member 564.

As illustrated in FIG. 5C, a fastener 526 (e.g., an eyebolt) is provided to complete the termination arrangement 500. To enable access to the end of the strength member 564, the fastener 526 is removable from the connector body 522. Stated another way, the fastener 526 is not permanently affixed to the connector body 522, and is not integrally formed with (e.g., cast with) the connector body 522. As illustrated in FIG. 5C, the fastener 526 is threadably engaged with the connector body 522 using fastener mating threads 536 and connector body mating threads 537. In this manner, the fastener 526 can be securely attached to the connector body 522 and can be readily detached from the connector body 522 to access the end of the strength member 564. The assembled termination arrangement 500 is illustrated in FIG. 5D.

In the event that it is desired to access the end of the strength member 564 after installation of the termination arrangement (e.g., onto a support structure), it may be necessary to maintain tension on the overhead electrical cable 560 to prevent the cable from sagging toward the ground to an undesirable height. In this regard, the termination arrangement illustrated in FIGS. 5A to 5D includes a sling coupling 538. The sling coupling 538 enables the termination arrangement to be temporarily secured to a support structure by attaching a sling (e.g., a high strength rope) to the support structure and to the termination arrangement 500, e.g., by placing the rope through the sling coupling 538. As illustrated in FIGS. 5A-5D, the sling coupling 538 is integrally formed with the connector body 522. It will be appreciated that the sling connector 538 may be formed in other parts of the termination arrangement 500, provided that it remains securely attached to the termination arrangement when the fastener 526 is detached from the connector body 522, e.g., as illustrated in FIG. 5C. For example, the sling coupling could be affixed (e.g., integrally formed with) the outer sleeve 540.

Figure 5E:
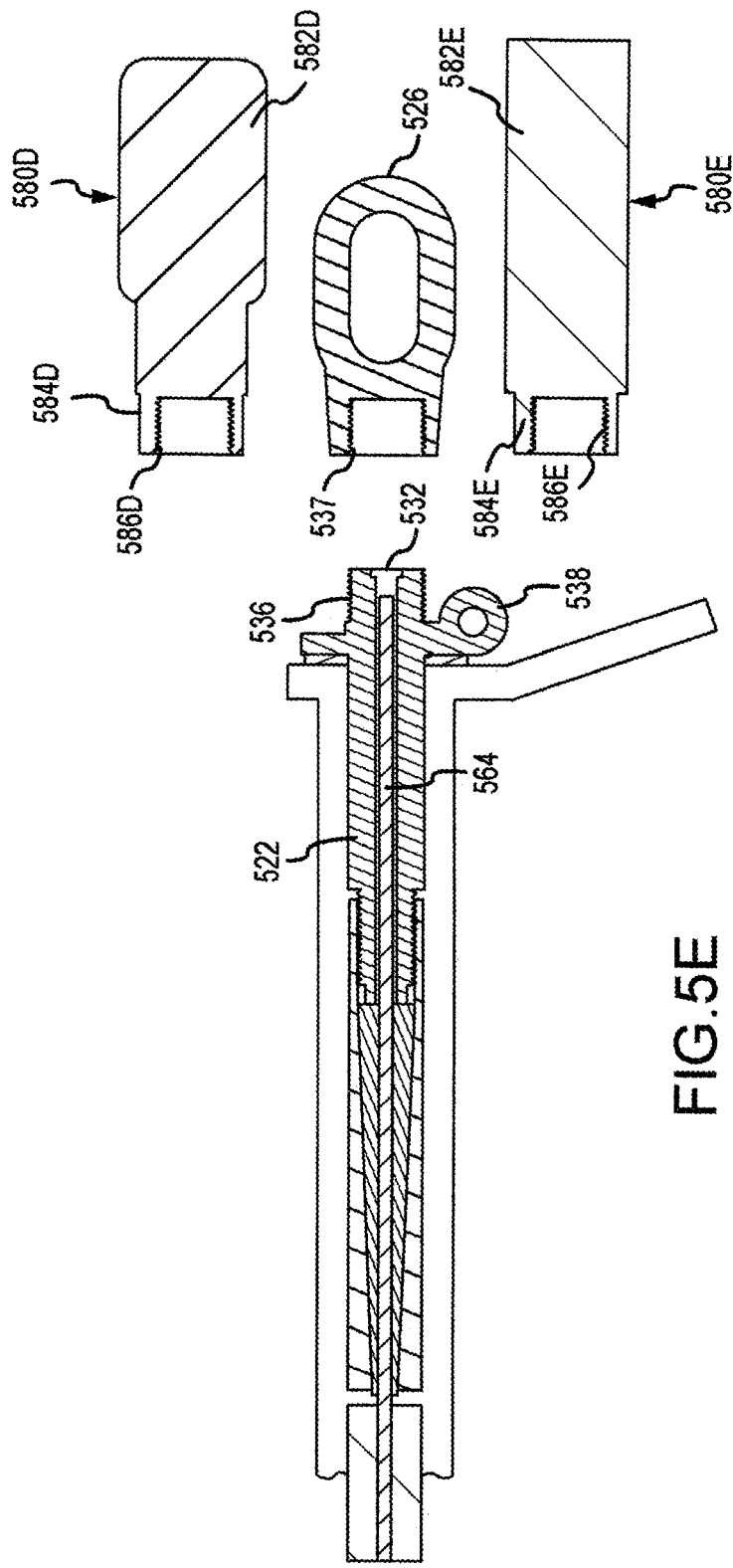

FIG. 5E schematically illustrates one example of how the termination arrangement illustrated in FIGS. 5A-5D may be utilized to facilitate interrogation of the strength member using an interrogation system. In the embodiment illustrated in FIG. 5E, two interrogation instruments are illustrated, namely a detector 580D and an emitter 580E. Depending upon the interrogation system utilized it may only be necessary to utilize a single instrument, e.g., an instrument connected at only one end of the strength member 564. In other systems it may be necessary to place an interrogation instrument at both ends of the strength member 564. For example, in certain embodiments, it may be necessary or desirable to place the emitter 580E at one end of the strength member and the detector 580D at the other end of the strength member.

In any event, the emitter 580E and the detector 580D each include an instrument body 582D/582E housing, e.g., instrument electronics such as a light emitter in the emitter body 582E (e.g., LED light, coherent light, etc.) and a detector in the detector body 582D (e.g., a CCD sensor or the like). Each of the instruments also includes a connection portion 584D/584E that is configured to be secured to the connector body 522 so that the instrument may be placed in communication (e.g., optical communication) with the strength member 564, e.g., with optical fibers associated with the strength member (see FIG. 4). As illustrated in FIG. 5E, the connection portion 584D/584E include connector body mating threads 586D/586D that are configured (e.g., sized) in the same manner as connector body mating threads 537 to engage the fastener mating threads 536. Thus, in operation, the fastener 526 may be removed (e.g., after securing the termination arrangement using sling coupling 538) to expose the end of the strength member 564 through aperture 532. One or more instruments 580D/580E may then be secured to the connector body and used to interrogate the strength member 564 by emitting and/or detecting a signal through the aperture 532. After interrogation of the strength member is complete, the fastener 526 may be reattached to the connector body 522 and again secured to the support tower or other structure.

In an alternative arrangement, an emitter instrument and/ or a detector instrument may be placed within the fastener, e.g., within the eyebolt, thereby obviating the need to remove the fastener to carry out the interrogation of the strength members. Power may be supplied to the instruments using an electrical connection extending through the fastener. See FIG. 10 below, for example.

Figures 6A, 6B:
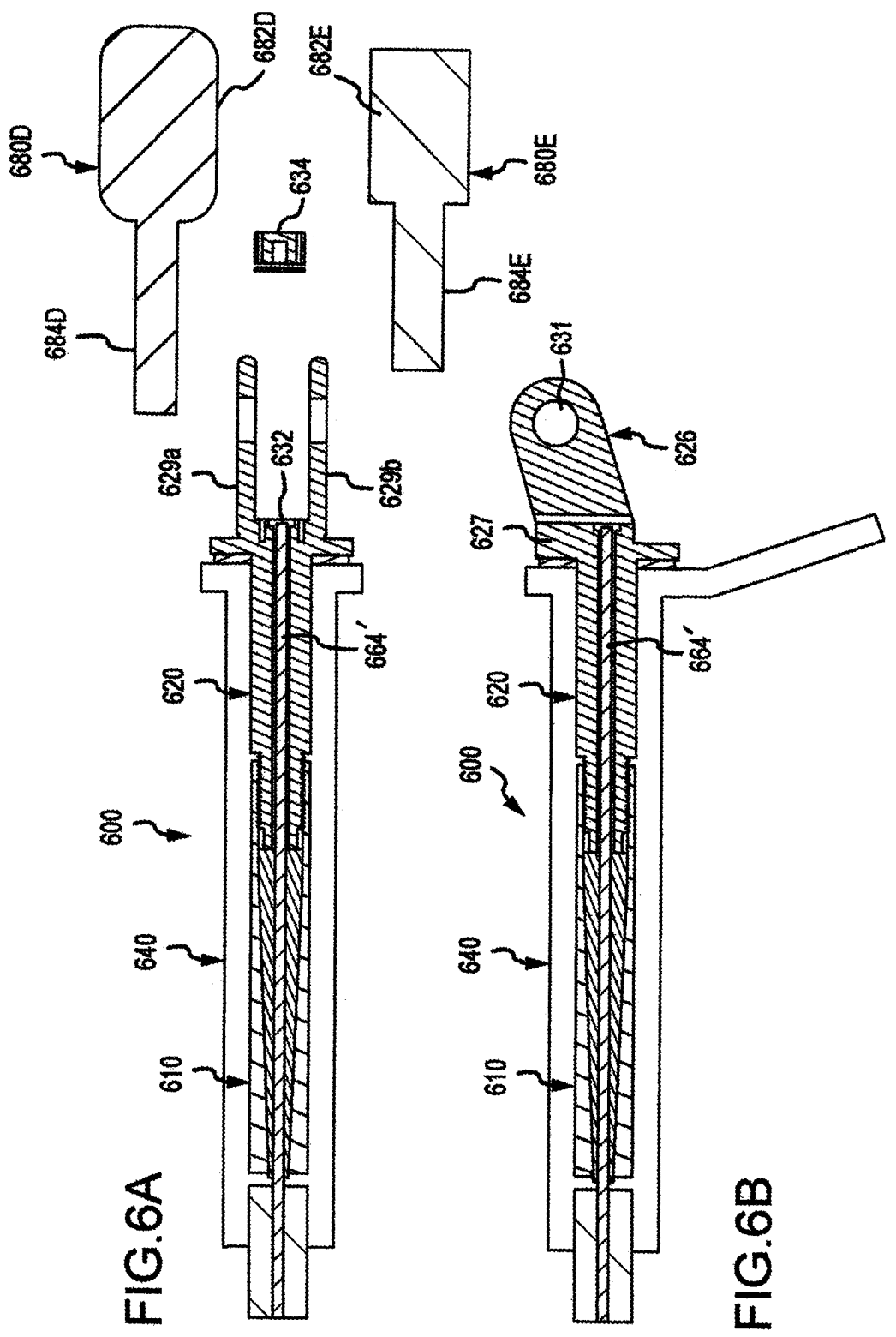
FIG. 6A-6B illustrate a termination arrangement according to an embodiment of the present disclosure.

FIGS. 6A and 6B illustrate another embodiment of a termination arrangement according to the present disclosure. The termination arrangement 600 is similar in structure to the termination arrangement 500 and generally includes a gripping element 610 that is operatively attached to a connector body 620 having a connector body bore through which the strength member 664 is placed substantially as illustrated in FIGS. 5A-5E. As compared to the embodiment illustrated in FIGS. 5A-5E, the fastener 626 is a clevis-type fastener having a clevis base 627 and two spaced-apart clevis prongs 629a/629b extending from the base 627. A clevis aperture 631 extends through both prongs to enable a bolt to be affixed to the prongs for connection to a dead-end structure.

In the embodiment illustrated in FIGS. 6A and 6B, it is not necessary to remove the fastener 626 to access the end of the strength member 664 due to the accessibility of the aperture 632 between the prongs 629a/629b. A cover 634 may be removably attached over the aperture 632 to seal the aperture 632 and protect the end of the strength member 664. For example, the cover 634 may be threaded, friction fit, and/or held in place by one or more fasteners. In the embodiment illustrated in FIGS. 6A and 6B, the clevis aperture 631 is offset from a longitudinal axis of the strength member 664, e.g., offset from the longitudinal axis of the connector body bore. More particularly, the clevis aperture 631 is centrally disposed in the prongs 629a/629b, and the prongs are disposed at an angle with respect to the connector 620. In this manner, the end of the strength member 664 may be accessed (e.g., after removal of the cover 634) without necessitating the detachment of the termination arrangement 600 from the support structure, as is described with the embodiment illustrated in FIGS. 5A-5D.

FIGS. 6A and 6B also illustrate two interrogation instruments, a detector 680D and an emitter 680E that may function in a manner similar to instruments 580D/580E in FIG. 5E. The instruments 680D/680E each include a connection portion 684D/684E that is configured to be secured to the connector 620 so that the instrument may be placed in communication (e.g., optical communication) with the strength member 664, e.g., with optical fibers associated with the strength member (see FIG. 4). As illustrated in FIGS. 6A and 6B, the connection portions 684D/684E enable the instruments to be operatively connected to the connector 620 (e.g., in a manner similar to the cover 634) such that the clevis prongs 629a/629b do not interfere with the instrument bodies 682a/682b.

Figures 7A, 7B, 7C:
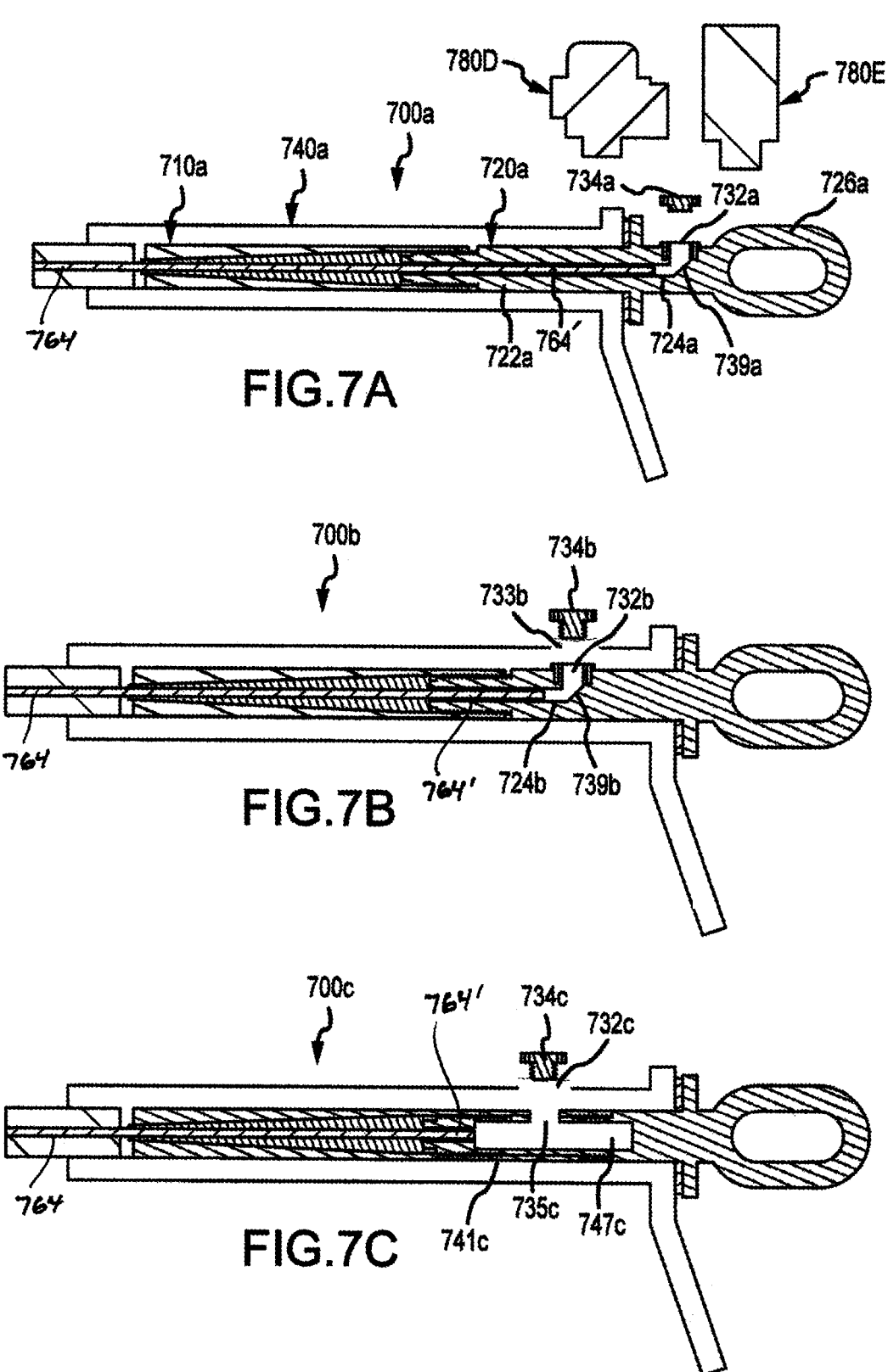
FIGS. 7A-7C illustrate a termination arrangement according to an embodiment of the present disclosure.

FIGS. 7A to 7C illustrate further embodiments of a termination arrangement according to the present disclosure. The termination arrangement 700a illustrated in FIG. 7A is structurally similar to the termination arrangements illustrated above and includes a gripping element 710a, a connector 720a and an outer sleeve 740a, where the end segment 764' of the strength member 764 extends through the connector body 722a. As illustrated in FIG. 7A, the aperture 732a is offset (e.g., angled) with respect to the strength member 764, e.g., is offset with respect to the bore 722a extending through the connector body 722a. As illustrated in FIG. 7A, the aperture 732a is substantially orthogonal to the bore 722a (e.g., at about 90° relative to the bore). Also, the aperture 732a is disposed near the interface of the connector body 722a and the fastener 726a, and the fastener is integrally formed with the connector body 722a, i.e., is not removable from the connector body 722a. To facilitate the transmission of a signal (e.g., a light signal) through the aperture 732a and into an end surface of the strength member segment 764', a reflective surface 739a (e.g., a mirror) is positioned at the interface between the aperture 732a and the bore 724a. To reflect the signal through an aperture that lies substantially orthogonal with the bore, the reflective surface 739a may be disposed at an angle of about 45° relative to the bore 722a. The reflective surface 739a may include, for example, a glass mirror or a highly reflective metal surface. In one implementation, the bore 724a comprises a step (e.g., a shoulder) near the proximal end to prevent the end of the strength member 764 from abutting against the reflective surface 739a when the strength member is inserted into the bore 724a. For example, the distance between the shoulder and the reflective surface 739a may be selected to match the desired focal length for the interrogation instrument(s).

As with the termination arrangement illustrated in FIGS. 6A and 6B, it will be appreciated that the strength member 764a may be interrogated without removing the fastener 726a from the connector body 722a, i.e., without removing the termination arrangement 700a from the support structure. In this regard, the cover 734a may be removed and the instruments 780E/780D may be operatively attached over the aperture 732a to interrogate the strength member 764a as described above.

The embodiment illustrated in FIG. 7B is similar to the embodiment illustrated in FIG. 7A, but where the aperture 732b (e.g., the interrogation port) is disposed in the connector body 722*b* and under the outer sleeve 740*b*. In this regard, an aperture 733*b* is also formed in the outer sleeve 740*b* to enable access to the aperture 732*b* and to the reflective surface 739*b*. The cover 734*b* is configured to be inserted into and seal against both the outer sleeve aperture 733*b* and the connector body aperture 732*b* to prevent ingress of contaminants and/or moisture into the termination arrangement 700*b*.

The embodiment illustrated in FIG. 7C is similar to the embodiment illustrated in FIG. 7B, but rather than a reflective surface a sleeve 741*c* (e.g., a tubular member) connects the collet housing 714*c* to the fastener 726*c*. Stated another way, the sleeve 741*c* replaces all or a portion of the connector body. The sleeve 741*c* includes a sleeve aperture 735*c* that may be aligned with the sleeve aperture 733*c* to enable access to the sleeve interior 747*c* and therefore to the end segment 764' of the strength member 764. Although the sleeve interior 747*c* could be provided with a reflective surface as illustrated in FIGS. 7A and 7B, the sleeve interior 747*c* may have a sufficient volume to insert an emitter or detector device into the sleeve interior 747*c* directly to enable interrogation of the strength member 764.

Figures 8A, 8B, 8C:
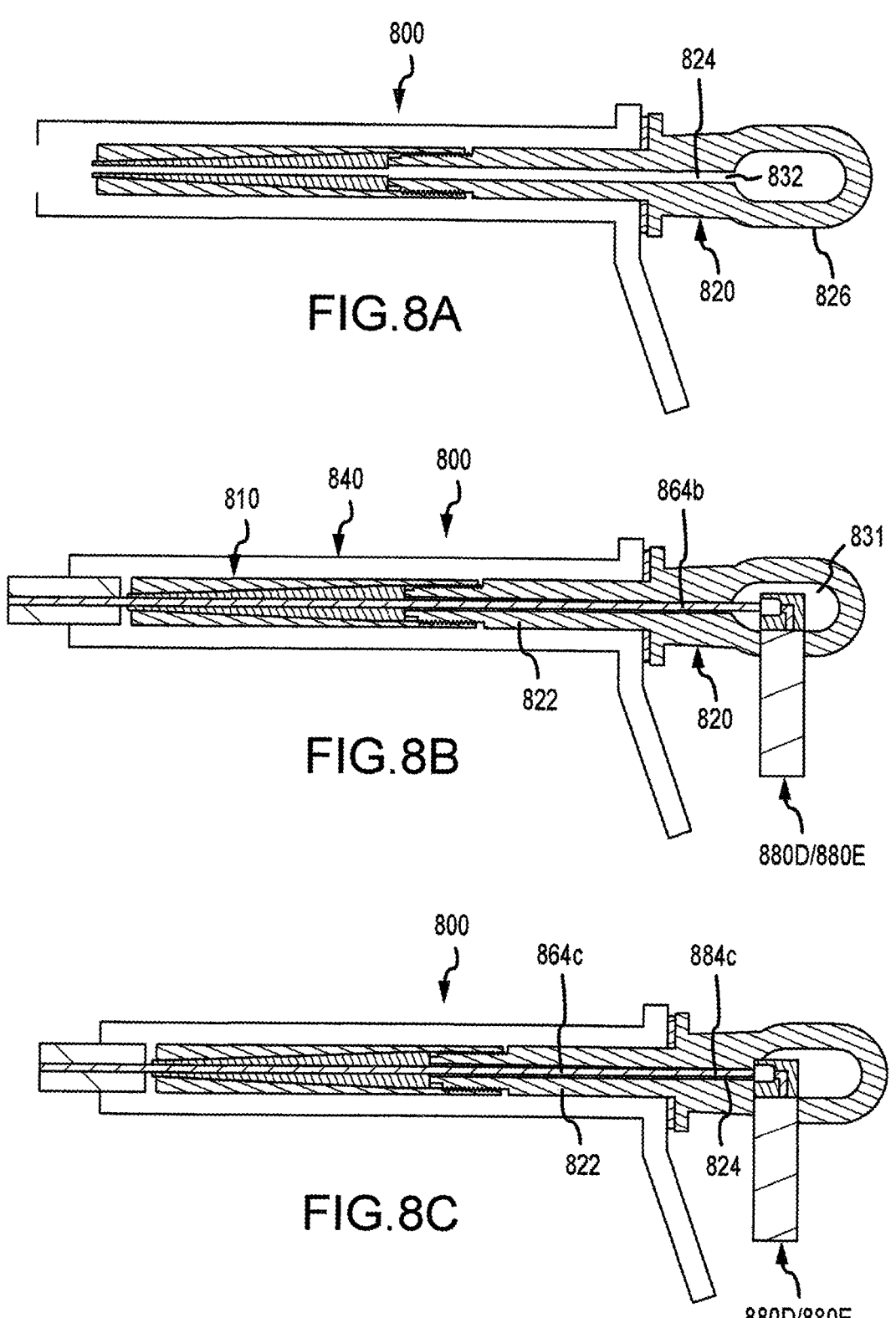
FIGS. 8A-8C illustrate a termination arrangement according to an embodiment of the present disclosure.

During installation, the fastener (e.g., the eyebolt) typically must be aligned in a vertical fashion as illustrated in FIGS. 7A-7C. Therefore, it is also preferred that the apertures (e.g., apertures 732*a*, 732*b* and 735*c*) be positioned to face generally upwardly when the eyebolt is so aligned, i.e., as illustrated in the figures. The jumper plate typically must be positioned downwardly as illustrated, and therefore it is preferred that the apertures in the outer sleeve (e.g., apertures 733*b* and 733*c*) be placed on the opposite side of the sleeve so that they generally face upwardly when the jumper plate is positioned as illustrated in the figures, FIGS. 8A to 8C illustrate another embodiment of a termination arrangement according to the present disclosure. Referring to FIG. 8A, the termination arrangement 800 includes a gripping element 810, a connector 820 and an outer sleeve 840, where the fastener 826 is integrally formed with the connector body 822. A connector body bore 824 extends through the connector body 822 from a distal end of the connector body 822, i.e., adjacent the gripping element 810, to an aperture 832 in the base of the fastener 826. As can be seen in FIG. 8B, the end segment 864' of the strength member 864 may extend past the aperture 832 such that the end surface of the segment 864' can be readily accessed for interrogation using an interrogation instrument. The end surface of the segment 864' may be covered (e.g., using a removable cap or by coating) to protect the end surface and the optical fibers (FIG. 4) from exposure when the strength member 864 is not being interrogated. In the embodiment illustrated in FIG. 8C, the end segment 864' of the strength member 864 terminates within the connector body 822 and the interrogation device 880D/880E includes an extension 884*c* (e.g., a light guiding tube) that is configured to be inserted down the bore 824 and in close proximity to the end surface of the end segment 864' to facilitate the interrogation. A cover (not illustrated) may be placed over the aperture 832 when interrogation is not being carried out.

Because the body often houses a battery and related circuitry, the body is often too large to be placed within the fastener aperture 831. Of note in FIGS. 8A-8C, the interrogation device 880D/880C is configured to enable interrogation of the strength member without removal of the fastener 826. In this regard, the interrogation signal is emitted/ detected at an angle relative to the device body so that the entire device body does not have to be inserted into the fastener aperture 831. Although illustrated as being disposed at an angle of about 90°, other angles and configurations may be utilized to enable interrogation without removal of the fastener. Further, the termination arrangement 800 may be assembled such that the end segment 864' of the strength member, e.g., strength member 864 in FIG. 8B, extends past the fastener 826 (e.g., through the aperture 831) such that an angled emitter or detector is not necessary to operatively access the end of the strength member 864*b*. Thus, the end segment 864' may extend well beyond the end of the fastener 826 to facilitate access to the strength member 864*b*. For example, the end segment 864' of the strength member 864 may extend beyond the aperture 832 by several millimeters or by several meters as may be desired. After interrogation of the strength member 864 is completed, the end segment of the strength member may be cut to reduce or eliminate the portion of the end segment that extends past the fastener 826, e.g., past the aperture 832.

Although illustrated as being implemented with an eyebolt-type fastener, it will also be appreciated that the embodiment illustrated in FIGS. 8A-8C may be implemented with a clevis-type fastener, e.g., a fastener of the type illustrated in FIGS. 6A to 6B. In such an implementation, the clevis aperture may be offset (e.g., as illustrated in FIGS. 6A and 6B), or may be in line with the connector body bore, e.g., where the prongs are not angled relative to the connector body bore.

One advantage of the embodiment illustrated in FIGS. 8A to 8C is that the interrogation instruments may be simplified, e.g., it will not be necessary to design the interrogation instruments to fit to a specific aperture configuration. For example, the interrogation instruments may be the same instruments that are utilized to interrogate the strength member before installation of the termination arrangement, e.g., prior to or during installation of the overhead electrical cable onto the support towers.

In the foregoing embodiments of a termination arrangement, particularly the embodiment illustrated in FIG. 7C, the interrogation device (e.g., the emitter and/or detector components) may be placed within the termination arrangement (e.g., within the sleeve interior 747*c*) and the cover placed over the aperture(s) to seal the components within the termination arrangement. Power for the device may be supplied by a battery or by inductive coupling using current passing through the outer sleeve. An antenna with associated circuitry may also be supplied to enable wireless transmission to control the interrogation device and/or to receive data from the interrogation device using a hand-held device, for example a tablet having a touchscreen display. If the device is in need of replacement, e.g., due to aging, the interior may be accessed by removing the cover and replacing the component(s).

The present disclosure also relates to splice arrangements for use with overhead electrical cables, such as splice 108*b* illustrated in FIG. 1. A splice arrangement for use with a fiber-reinforced composite strength member is disclosed, for example, in U.S. Pat. No. 7,019,217 by Bryant, which is incorporated herein by reference it its entirety. Although a splice maintains electrical conductivity between the two cable segments, the strength members of the two segments are separated within the splice. That is, there is a discontinuity of the strength member within the splice lying between two dead ends. Because of this discontinuity, the entire length of the cable between the two dead ends cannot be interrogated (e.g., using optical fibers) by using interrogation devices attached only at the termination arrangements. Thus, the present disclosure includes embodiments of a splice arrangement that permit interrogation of the strength member, e.g., from the splice to each of the dead ends, so that the entire length of the cable can be interrogated.

Figures 9, 10:
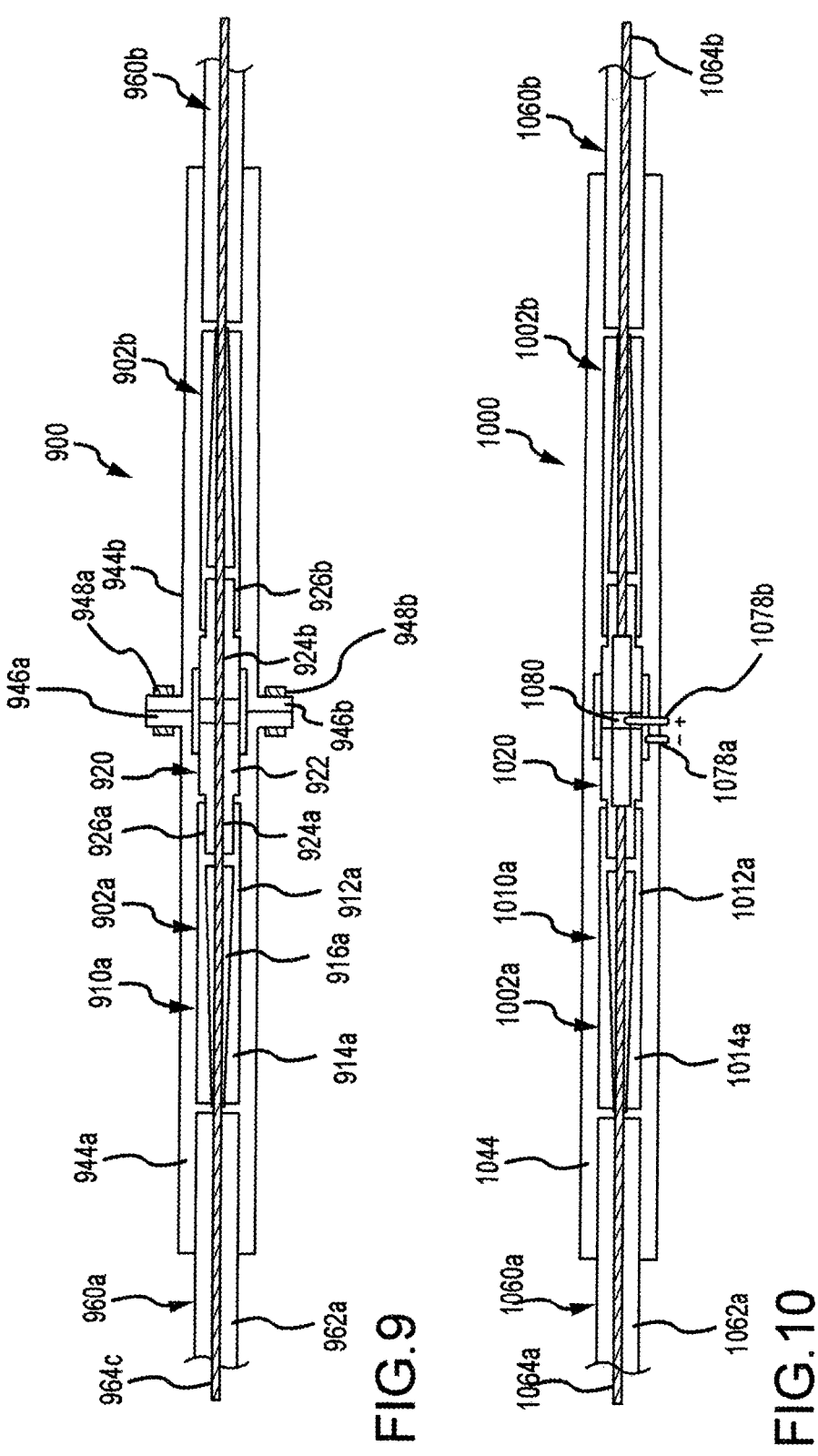
FIG. 9 illustrates a splice arrangement according to an embodiment of the present disclosure.
FIG. 10 illustrates a splice arrangement according to an embodiment of the present disclosure.

FIG. 9 illustrates one embodiment of such a splice arrangement. Splice arrangements will often include hardware components that are structurally similar to the components of a termination arrangement, e.g., as described above, and include two sets of the components at each end of the splice arrangement to grip the two cables. Referring to FIG. 9, the splice arrangement 900 includes two splice portions 902a and 902b at opposite ends of slice arrangement 900, where the splice portion 902a secures overhead electrical cable 960a and the slice portion 902b secures overhead electrical cable 960b. Because splice portions 902a and 902b are substantially identical, only splice portion 902a will be described in more detail.

As noted above, the gripping hardware in the splice arrangement may be substantially similar to the gripping hardware used in the termination arrangements. Thus, the splice includes a gripping element 910a having a collet 912a disposed in a collet housing 914a. The strength member 964a of the overhead electrical cable 960a extends past the conductor 962a and into a lumen 916a where it is gripped by the collet 912a.

To physically secure the first splice portion 902a to the second splice portion 902b, and thereby secure the first cable 960a to the second cable 960b, a connector assembly 920 is utilized. The connector assembly 920 includes a central connector body 922 and collet mating threads 926a/926b disposed at each end of the connector body 922, where the collet mating threads are configured to mate with connector threads disposed on the collet housing 914 to compress the collet 912 into the housing 914. The connector assembly 920 also includes a connector assembly bore 924a/924b extending though the assembly, e.g., through the entire assembly, to enable the strength members to extend close to the center of the body 922 to enable interrogation of the strength members 964a and 964b.

The splice arrangement 900 also includes a conductive body 944 to facilitate electrical connection between the overhead cable 960a and the overhead cable 960b. In the embodiment illustrated in FIG. 9, the conductive body includes two mating conductive body portions 944a and 944b that are joined at a pair of mating flanges 946a and 946b. The flanges 946a/946b may be secured to each other using two or more flange bolts 948a/948b that extend through bolt apertures in the flanges 946a/946b. Alternatively, a ferrule may be used to secure the mating flanges 946a/946b. Typically, the conductive body 944 will be crimped onto the underlying hardware and/or onto the electrical conductor. For example, crimps may be placed over the connector body 920, over the gripping element 910 and/or over the electrical cable 960a/960b to further secure the physical and electrical connection between the two cables.

To interrogate one or both of the strength members 960a/960b after installation of the overhead electrical line including the splice arrangement, the bolts 948a/948b may be removed and the conductive body portions 944a/944b separated. To temporarily hold the two portions of the splice arrangement together, the flanges 946a/946b may be provided with additional apertures or hooks to enable a high strength rope to connect to the flanges and hold the portions together under tension.

Another embodiment of a splice arrangement is illustrated in FIG. 10. In the embodiment illustrated in FIG. 10, many of the hardware components are the same or substantially similar to the hardware components illustrated if FIG. 9, including the gripping element 1010a including a collet 1012a and a collet housing 1014a. In the embodiment illustrated in FIG. 10, the conductive body 1044 is fabricated from a single (e.g., unitary) body and extends over the first and second splice portions 1002a/1002b.

In the embodiment illustrated in FIG. 10, an emitter device 1080 (e.g., an LED, coherent light source or the like) is contained within the connector assembly 1020 in a manner such that the emitter device 1080 may emit light into the end of each of the strength members 1064a and 1064b. Thus, a detector may be placed at opposite ends of the strength members 1064a/1064b (e.g., through a termination arrangement described above) to detect and/or analyze the light signal emanating from the emitter 1080 and through the optical fiber(s) (FIG. 3). In an alternative arrangement, the connector assembly many include a detector (e.g., a photodiode or the like) and the emitter may be placed at the termination of the overhead cables.

In any event, power may be supplied to the emitter 1080 using electrical contacts 1078a and 1078b. For example, to conduct the interrogation, a portable power source such as a battery may be attached to the electrical contacts 1078a/1078b to power the emitter. The electrical contacts extend through the conductive body 1044 and into the connector assembly 1020. The port(s) where the contacts 1078a/1078b pass through the conductive body 1044 may be sealed to prevent the ingress of contamination into the splice arrangement 1000.

Figure 11A:
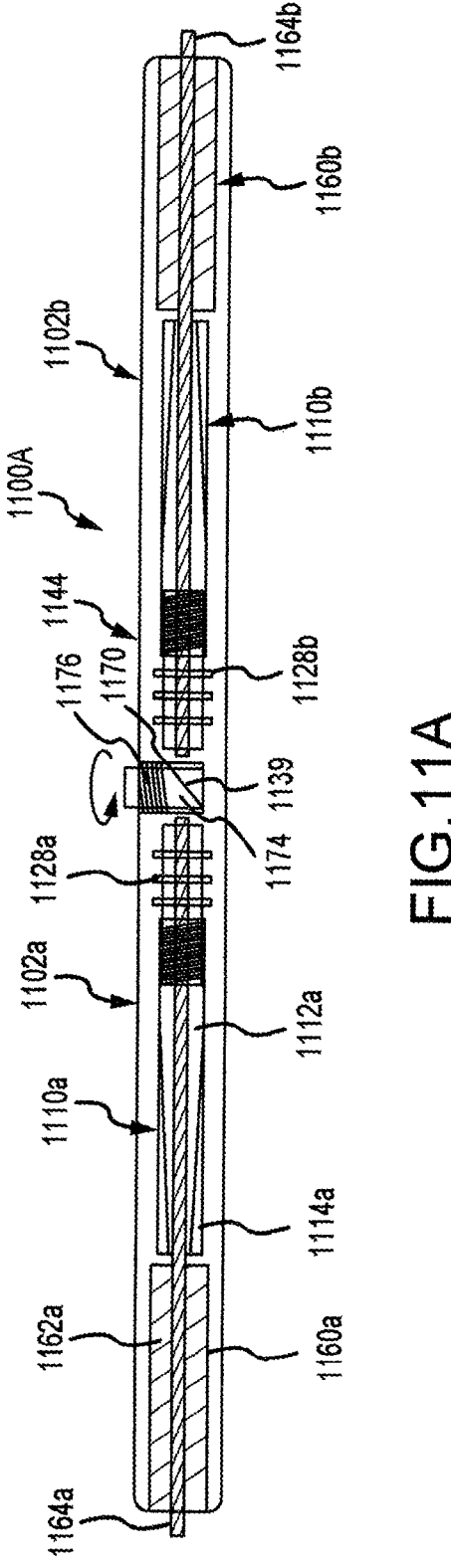
FIGS. 11A-11B illustrate a splice arrangement according to an embodiment of the present disclosure.

Another embodiment of a splice arrangement is illustrated in FIG. 11A. As with the embodiments illustrated in FIGS. 9 and 10, the slice arrangement 1100A includes two splice portions 1102a and 1102b to secure two electrical cables 1160a and 1160b. Each splice portion includes a collet-type gripping element, e.g., gripping element 1110a includes a collet 1112a housed in a collet housing 1114a to grip the strength member 1164a.

The splice arrangement 1100A includes a conductive body 1144 that is a single piece (e.g., is unitary) that extends over both gripping elements 1110b. The conductive body 1144 also includes an interrogation port 1170 to enable access to the ends of the strength members 1164a/1164b within the splice arrangement. An interrogation sleeve 1172 is placed within the port 1170 to facilitate the emission and/or detection of light signals to/from the strength members 1164a/1164b. The interrogation sleeve 1172 is in the form of a round cylinder, e.g., having a sidewall and an aperture 1174 extending therethrough. A reflective surface 1139 (e.g., a mirror) at the bottom of the aperture 1174 is provided to enable a light signal emanating from the strength member to be reflected upwardly for detection through the aperture 1174. Advantageously, the interrogation sleeve 1172 may be rotated, e.g., about threads 1176, so that the reflective surface faces the opposite strength member 1164b. In this manner, both strength members 1164a/1164b may be readily interrogated by simply rotating the sleeve 1172 into the desired position. A cap may be provided on the top of the sleeve 1172 to prevent ingress of contamination when the sleeve is not in use.

Because the gripping elements 1110a/1110b are not joined within the splice arrangement (e.g., as in FIG. 9), the physical joining of the cables is achieved by crimping the conductive body 1144 onto each of the gripping elements 1110a/1110b. To enhance the ability of the crimp to secure the gripping elements 1110a/1110b, the gripping elements are provided with ribs 1128a/1128b or a similar surface feature such that the crimping will cause the conductive body 1144 to deform into the gaps between the ribs 1128*a*/1128*b*.

Figure 11B:
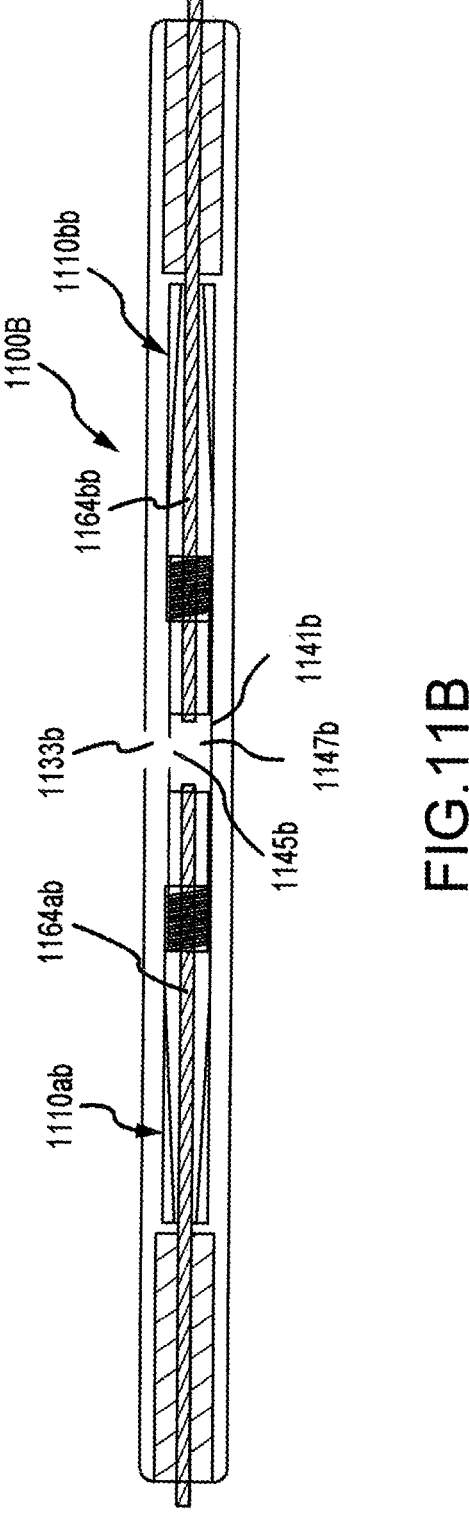

The embodiment of a splice arrangement illustrated in FIG. 11B is similar to the termination arrangement illustrated in FIG. 7C. Specifically, the splice arrangement 1100B includes a sleeve 1141*b* replaces all or a portion of the connector body that connects the two gripping elements 1110*ab* and 1110*bb*. The sleeve 1141*b* includes a sleeve aperture 1135*b* that may be aligned with the sleeve aperture 1133*b* to enable access to the sleeve interior 1147*b* and therefore to the ends of the strength members 1164*ab* and 1164*bb*. Although the sleeve interior 1147*b* could be provided with a reflective surface as illustrated in FIG. 11A, the sleeve interior 1147*b* may have a sufficient volume to insert an emitter or detector device into the sleeve interior 1147*b* directly to enable interrogation of the strength members 1164*ab* and 1164*bb*.

In the foregoing embodiments, particularly the embodiment illustrated in FIG. 11B, the components (e.g., the emitter and/or detector components) may be placed within the splice arrangement (e.g., within the sleeve interior 1147*b*) and the cover placed over the apertures to seal the components within the splice arrangement. Power for the device may be supplied by a battery or by inductive coupling using current passing through the outer sleeve. An antenna with associated circuitry may also be supplied to enable wireless transmission to control the interrogation device and/or to receive data from the interrogation device using a hand-held device, for example a tablet having a touchscreen display. If the device needs replacement, e.g., due to aging, the interior may be accessed by removing the cover and replacing the component(s). In any event, although the device secured within the splice arrangement may be an emitter and detector, it may be preferred to place an emitter within the splice with a detector placed at the termination arrangement at the opposite end of the strength member.

Figure 12:
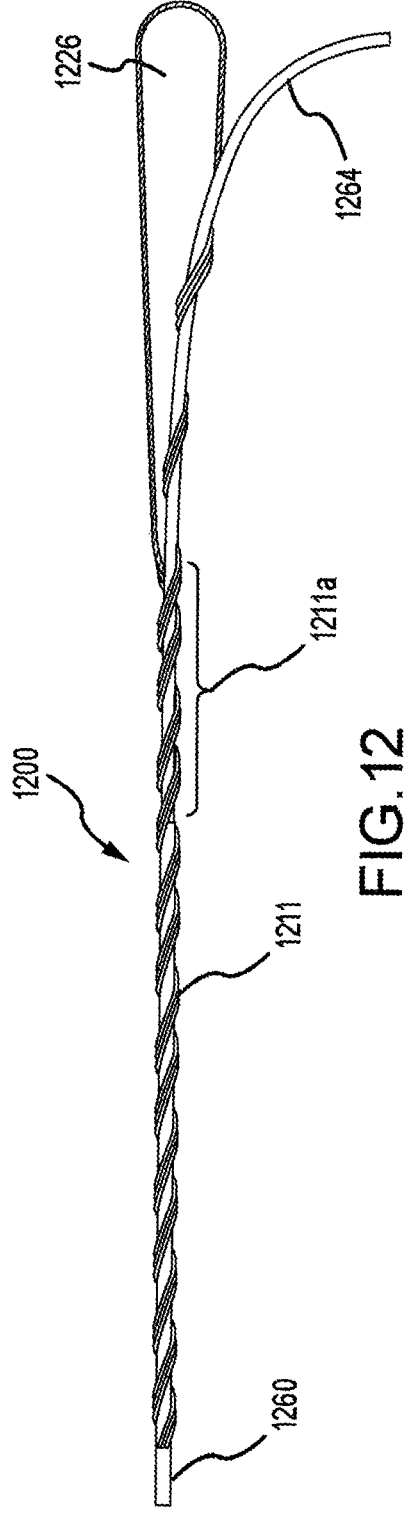
FIG. 12 illustrates a termination arrangement according to an embodiment of the present disclosure.

Another embodiment of a termination arrangement is illustrated in FIG. 12. This type of termination arrangement 1200 is sometimes referred to as a helical dead end. See, for example, US Patent Application No. 2019/0081470 by Ma et al., which is incorporated herein by reference in its entirety. In this arrangement, structural rods or strands 1211 are helically wrapped around the cable 1260 to grip onto the cable 1260 and are formed into a loop 1226 at the distal end of the arrangement 1200. In this arrangement, to enable interrogation of the strength member 1264, a portion 1211*a* of the structural strands are wrapped around a portion of the strength member that has been stripped of the overlying conductor strands. The end of the strength member 1264 extends beyond the strands 1211 and is exposed to enable interrogation. The exposed end of the strength member may be capped or sealed when interrogation is not being carried out to prevent damage to the end of the strength member.

The foregoing embodiments are presented to illustrate termination arrangements and a splice arrangements that facilitate the interrogation of overhead electrical cables during and/or after installation of the electrical line (e.g., a distribution line or a transmission line). As such, the foregoing embodiments are subject to various modifications that are not specifically illustrated above. For example, the gripping elements are illustrated as comprising a collet-type grip having a collet and a collet housing. However, other types of gripping elements may be utilized. For example, a gripping element may include a direct compression device such as that illustrated in U.S. Pat. No. 6,805,596 by Quesnel et al. and assigned to Alcoa Fujikura Limited, which is incorporated herein by reference in its entirety.

In the embodiments of a termination arrangement, the jumper plate is illustrated as being disposed at the very proximal end of the conductive body. However, other arrangements are possible such as a "shark-fin" arrangement wherein the jumper plate is disposed closer to the middle of the conductive body.

The foregoing termination arrangements and splice arrangements may be utilized with a variety of electrical cables having strength members, particularly fiber-reinforced composite strength members. Interrogation techniques may include laser-based techniques such as optical time domain reflectometry (OTDR), or incoherent light techniques such as those disclosed in International Patent Publication No. WO 2019/168998 by Dong et al., which is incorporated herein by reference in its entirety.

It will be appreciated that the foregoing disclosure also relates to methods for securing an overhead electrical cable to a termination arrangement (e.g., to a dead-end), and to methods for interrogating a strength member through the hardware. The interrogation may occur after the overhead electrical cable has been fully tensioned and secured by the hardware, e.g., secured to a support tower as illustrated in FIG. 1. In one embodiment, a method for terminating an overhead electrical cable comprising a central strength member and a plurality of conductive strands wrapped around the strength member, the method comprising the steps of separating an end portion of the strength member from the conductive strands, inserting the end portion of the strength member into a termination arrangement, the termination arrangement comprising a connector having a connector body and a connector body bore, wherein the step of inserting the strength member includes placing the end portion of the strength member at least partially into the connector body bore.

In another embodiment, a method for interrogating an overhead electrical cable through a termination arrangement is disclosed where the overhead electrical cable has a strength member comprising interrogation elements and a plurality of conductive strands wrapped around the strength member. The method may include the steps of separating an end segment of the strength member from the conductive strands, operatively securing a termination arrangement to the overhead electrical cable, where the termination arrangement includes a gripping element configured to grip the strength member and a connector operatively attached to the gripping element, the connector comprising a connector body and a connector body bore extending longitudinally from a first aperture in a proximal end of the connector body toward a distal end of the connector body. The step of operatively securing the termination arrangement to the overhead electrical cable includes securing a first portion of the end segment of the strength member with the gripping element and placing a second portion of the end segment of the strength member into the connector body bore. Interrogation of the strength member may be carried out by operatively linking (e.g., contacting directly or indirectly) an interrogation device to the end of the strength member. During the interrogation, the strength member may be fully disposed within the termination arrangement (see FIG. 5E for example) or may extend beyond the termination arrangement (see FIG. 8B for example).

While various embodiments termination arrangements and methods for the termination and interrogation of an overhead electrical cable have been described in detail, it is apparent that modifications and adaptations of those embodiments will occur to those skilled in the art. However, it is to be expressly understood that such modifications and adaptations are within the spirit and scope of the present disclosure.

What is claimed is:

1. A termination arrangement for an overhead electrical cable, comprising:
   a compression-type gripping element gripping a fiber-reinforced composite strength member of an overhead electrical cable;
   a connector operatively attached to the compression-type gripping element, the connector comprising:
      a connector body; and
      a connector body bore extending longitudinally through the connector body from a first connector body aperture in the proximal end of the connector body to a second aperture in the distal end of the connector body;
      an outer sleeve disposed over at least the gripping element, wherein the outer sleeve comprises a conductive body; and
      a removable cover operatively disposed over the second aperture.

2. The termination arrangement recited in claim 1, comprising a fastener operatively affixed to the proximal end of the connector body.

3. The termination arrangement recited in claim 2, wherein the fastener comprises a clevis having a base and two spaced-apart clevis prongs extending from the base.

4. The termination arrangement recited in claim 3, wherein the second aperture is disposed through the base and between the two spaced-apart prongs.

5. The termination arrangement recited in claim 4, wherein each of the bolt apertures are offset from the longitudinal axis of the connector body.

6. The termination arrangement recited in claim 3, wherein each of the two spaced-apart prongs comprises a bolt aperture disposed near a proximal end of the prong.

7. The termination arrangement recited in claim 2, wherein the fastener is detachable from and re-attachable to the connector body.

8. The termination arrangement recited in claim 7, wherein the fastener is threadably engaged with the connector body.

9. The termination arrangement recited in claim 7, wherein the fastener is bolted to the connector body.

10. The termination arrangement recited in claim 7, wherein the fastener comprises a clevis having a base and two spaced-apart prongs extending from the base.

11. The termination arrangement recited in claim 7, wherein the fastener comprises an eyebolt comprising a base and a closed loop extending from the base.

12. The termination arrangement recited in claim 7, further comprising a sling coupling affixed to the connector body.

13. The termination arrangement recited in claim 12, wherein the sling coupling comprises a closed loop.

14. The termination arrangement recited in claim 1, wherein the compression-type gripping element comprises a compression wedge.

15. The termination arrangement recited in claim 14, wherein the compression wedge comprises a collet disposed within a collet housing.

16. The termination arrangement recited in claim 15, wherein the connector body is operatively attached to the collet housing.

17. The termination arrangement recited in claim 1, wherein the conductive body is fabricated from aluminum.

18. The termination arrangement recited claim 17, wherein the outer sleeve surrounds at least a portion of the connector body.

19. The termination arrangement recited in claim 17, wherein the outer sleeve comprises a jumper plate operatively attached to the conductive body.

20. The termination arrangement recited in claim 1, wherein the longitudinal connector body bore is sized and shaped to receive the strength member of an overhead electrical cable.

21. The termination arrangement recited in claim 1, wherein the longitudinal connector body bore has a substantially circular cross-section and has a diameter of at least about 6 mm.

22. The termination arrangement recited in claim 1, wherein the longitudinal connector bore has a diameter of not greater than about 18 mm.

23. The termination arrangement recited in claim 1, wherein the fastener comprises an eyebolt.

24. The termination arrangement recited in claim 23, wherein the eyebolt is permanently affixed to the connector body.

25. The termination arrangement recited in claim 24, comprising an eyebolt bore extending through a base of the eyebolt, wherein the eyebolt bore lies along the longitudinal axis of the connector body bore.

26. The termination arrangement recited in claim 25, wherein the eyebolt bore has substantially the same size and cross-section as the connector body bore.

27. A termination arrangement for an overhead electrical cable, comprising:
   a compression-type gripping element gripping a fiber-reinforced composite strength member of an overhead electrical cable;
   a connector operatively attached to the compression-type gripping element, the connector comprising:
      a connector body; and
      a connector body bore extending longitudinally from a first aperture in a proximal end of the connector body toward a distal end of the connector body,
      wherein the longitudinal connector body bore is in operative communication with a non-longitudinal bore that is disposed at an angle of from about 70° to about 130° relative to the longitudinal connector body bore.

28. The termination arrangement recited in claim 27, comprising a non-longitudinal bore aperture disposed at an end of the non-longitudinal bore.

29. The termination arrangement recited in claim 28, comprising a removable cover operatively disposed over non-longitudinal bore aperture.

30. The termination arrangement recited in claim 27, further comprising a second non-longitudinal bore that is disposed at an angle of less than 180° relative to the connector body bore.

31. The termination arrangement recited in claim 27, comprising a reflective element disposed at an interface between the connector body bore and the non-longitudinal bore, where the reflective element is configured to reflect light between the connector body bore and the non-longitudinal bore.

32. The termination arrangement recited in claim 27, wherein the connector body bore terminates before a distal end of the connector body.

33. The termination arrangement recited in claim 27, wherein the connector body bore extends to the distal end of the connector body.

* * * * *